US010411477B2

United States Patent
(12) United States Patent
Kaufman et al.

(10) Patent No.: US 10,411,477 B2
(45) Date of Patent: Sep. 10, 2019

(54) DISTRIBUTED SUBSTRING ARCHITECTURE FOR MAXIMUM POWER POINT TRACKING OF ENERGY SOURCES

(71) Applicant: Pika Energy, Inc., Westbrook, ME (US)

(72) Inventors: Joshua Daniel Kaufman, Gorham, ME (US); Benjamin Francis Polito, Gorham, ME (US); Keith Thomas Richtman, Sacramento, CA (US)

(73) Assignee: Pika Energy, Inc., Westbrook, ME (US)

( * ) Notice: Subject to any disclaimer, the term of this patent is extended or adjusted under 35 U.S.C. 154(b) by 884 days.

(21) Appl. No.: 13/849,320

(22) Filed: Mar. 22, 2013

(65) Prior Publication Data

US 2013/0328403 A1 Dec. 12, 2013

Related U.S. Application Data

(60) Provisional application No. 61/615,472, filed on Mar. 26, 2012.

(51) Int. Cl.
*H02J 3/38* (2006.01)

(52) U.S. Cl.
CPC ............... *H02J 3/385* (2013.01); *Y02E 10/58* (2013.01); *Y10T 307/685* (2015.04)

(58) Field of Classification Search
CPC ....... H02J 3/385; Y02E 10/58; Y10T 307/685
See application file for complete search history.

(56) References Cited

U.S. PATENT DOCUMENTS

| | | | | |
|---|---|---|---|---|
| 7,116,010 B2 | 10/2006 | Lasseter et al. | | |
| 2005/0105224 A1* | 5/2005 | Nishi | H02M 3/285 | 361/18 |
| 2010/0269883 A1* | 10/2010 | Sarhan | H02M 1/32 | 136/244 |
| 2011/0084557 A1* | 4/2011 | Ger | H02J 3/383 | 307/82 |
| 2011/0133552 A1* | 6/2011 | Binder | H02J 3/383 | 307/22 |
| 2011/0187198 A1* | 8/2011 | Williams | H02J 1/12 | 307/71 |
| 2012/0274139 A1* | 11/2012 | Agamy | H02J 3/385 | 307/71 |

* cited by examiner

*Primary Examiner* — Daniel Kessie
(74) *Attorney, Agent, or Firm* — Schwegman Lundberg & Woessner, P.A.

(57) ABSTRACT

A photovoltaic array system includes multiple strings of series coupled photovoltaic modules to provide current at a voltage dependent on the number of modules in each string and their operating efficiency. Each string is coupled to a DC-to-DC converter to convert the current from each string for output to a DC bus. An inverter is coupled to DC bus to convert the current from the strings of series coupled photovoltaic modules to AC current at a grid-compatible voltage.

20 Claims, 4 Drawing Sheets

105
UTILITY GRID
150
130
DC
AC
140
DC
DC
120
110
100

201
PV
A. PV Link
B. PV Link
C. Other Converter
Other Source
D. Inverter
E. Other Load
DSP
Gate Drive
v
i
AC Phase1
AC Phase2
Neutral
210
211
212
213
214
215
216
217
230
239
241
242
243
244
245
246

DISTRIBUTED SUBSTRING ARCHITECTURE FOR MAXIMUM POWER POINT TRACKING OF ENERGY SOURCES

RELATED APPLICATION

This application claims priority to U.S. Provisional Application Ser. No. 61/615,472 (entitled Distributed Substring Architecture for Maximum Power Point Tracking of Solar Arrays, filed Mar. 26, 2012) which is incorporated herein by reference.

BACKGROUND

Solar photovoltaic (PV) conversion devices are an increasingly important source of electricity. The basic PV building block is a PV cell, a semiconductor device which converts light energy into electric current. In common practice, PV cells are connected electrically in series and physically encapsulated in a protective assembly to form PV modules, each of which is typically on the order of 1 square meter in aperture area. PV modules are in turn connected electrically in series and assembled physically into an array. The electrical output of the array is typically connected to an inverter, which converts the DC output of the PV array to AC for use.

PV cells (and thus PV modules and PV arrays) exhibit a nonlinear relationship between terminal voltage and current. The load impedance that is applied to the PV array must be dynamically adjusted in order to extract the maximum possible power from the array, in a process known as Maximum Powerpoint Tracking (MPPT).

SUMMARY

An array of PV modules is arranged into substrings, each substring being connected to a distributed substring converter. Each substring converter performs maximum powerpoint tracking and converts the voltage of the array, feeding the array output onto a split-voltage DC bus. Additional such substrings are connected in parallel to the DC bus through separate substring converters. One or more centralized inverters convert the aggregate DC output of the substrings to the AC grid.

DETAILED DESCRIPTION

Figure 1:
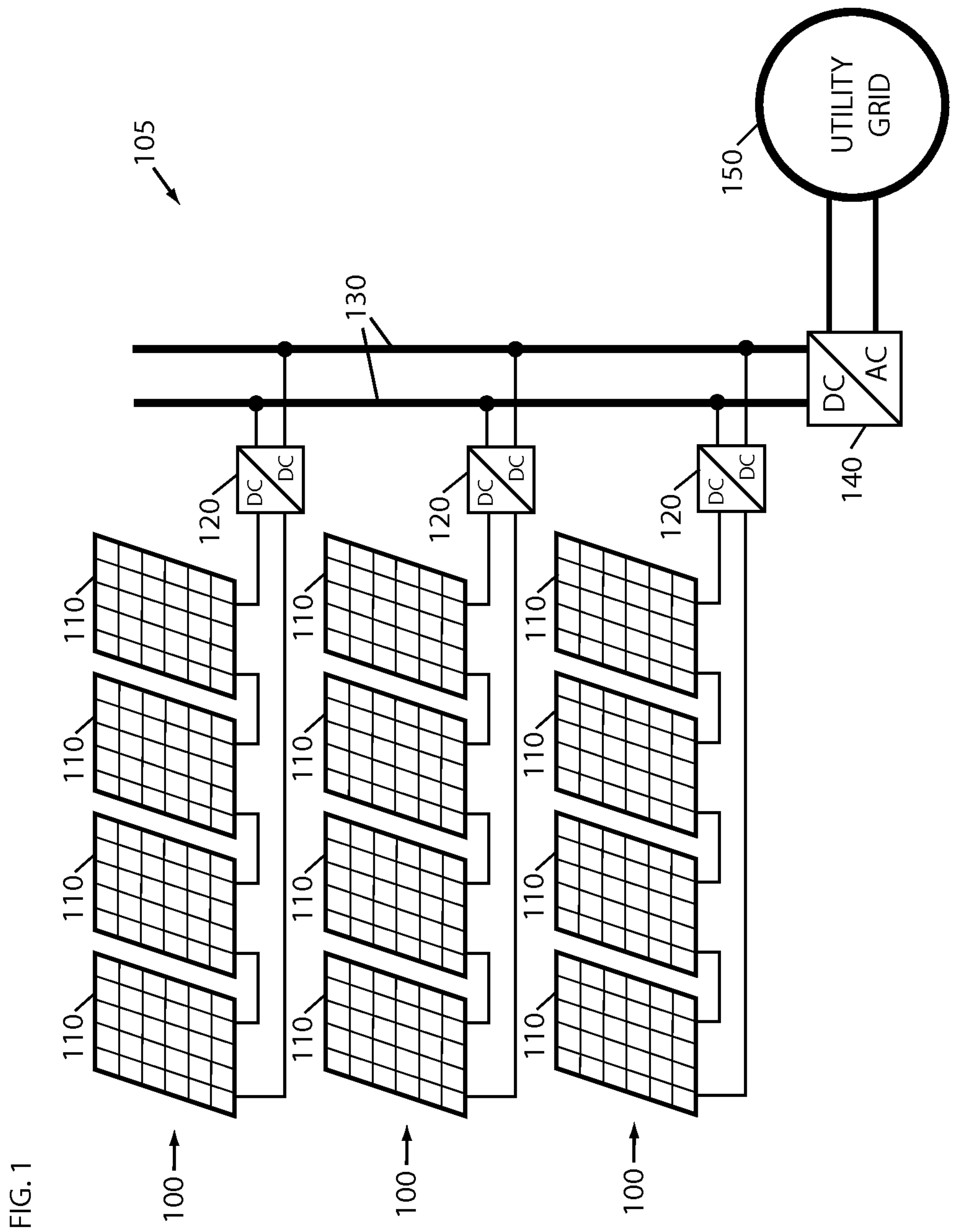
FIG. 1 is a block diagram of a photovoltaic array having distributed DC to DC converters according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on a storage device, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The design of PV arrays is influenced by the intended use of the electricity generated. While in specialized and remote applications the electricity may be stored in batteries, the most common modern approach is to use an inverter to convert the DC power generated by the PV modules to 60 Hz AC for local use and for backfeed into the grid. In the conventional PV array design, PV modules are connected in series strings to achieve the design input voltage of the inverter to be used. Such series strings are then combined in parallel to achieve an array of the desired voltage, up to the maximum voltage rating of the inverter. The inverter typically comprises two stages—an input DC-DC converter that performs the desired impedance matching or "maximum powerpoint tracking" ("MPPT"), while at the same time regulating the input voltage to a second stage, the DC to AC inverter. The inverter stage converts the regulated DC output from the MPPT stage to 60 Hz AC power at an appropriate voltage for the local grid connection.

This approach has significant drawbacks, especially as relating to maximum powerpoint tracking Since the modules in each string are connected in series, each module in the string is constrained to carry the same current, which in general will not be exactly the same as each module's maximum powerpoint current. This results in sub-optimal energy capture, especially in cases where portions of the string are dirty or temporarily in shadow (for instance because of trees or other obstacles), or where there are significant manufacturing variations among the modules. The strings are then connected in parallel, and this forces each string to operate at the same voltage, which again will not generally be the maximum powerpoint voltage for that string. The MPPT algorithm in the input stage of the inverter seeks the maximum power point of the array as a whole, but at best a small fraction of the modules will actually be operating at their true maximum powerpoint. These considerations limit the performance of PV arrays under real-world conditions, and in general designers are forced to use a single type of module for the entire installation.

An alternative approach which may avoid some of the above limitations is to produce miniature inverters ("microinverters"), each sized for a single module and capable of performing both the MPPT function and the DC-AC inverter functions of the central inverter. The AC output of these microinverters is then combined in parallel and connected directly to the grid. This approach allows individual MPPT of each module, but it has significant drawbacks, including massive duplication of overhead components including microprocessors, housings, mounting hardware, and connectors Typical PV module voltages are approximately several times lower than typical AC line voltages, and it is technically challenging and relatively expensive to produce an inverter that operates at a significant voltage step-up. Each microinverter is provided with capacitors sufficient to absorb energy from the PV module at a steady rate while delivering pulses of energy at 120 Hz to produce the desired AC waveform. Since heat has a significant negative effect on capacitor life, placing inverter electronics directly behind hot PV modules may cause premature failure. And since in a large array the loss of a single module may not be noticed in the total output, each microinverter is typically outfitted with a communication system (whether wireless or powerline-carrier) that reports on its performance, further adding to the cost.

A third prior approach involves the installation of a DC-DC converter on each PV panel, which enables independent maximum-powerpoint tracking of each panel. The converter-equipped modules are connected electrically into series strings, and the strings are then connected to a central inverter. This approach substantially avoids the need for life-limiting storage capacitors at the PV panel, but still requires a circuit board, a power converter with microprocessor and sensors, and a physical enclosure for each panel—and unlike the microinverter approach, it does not eliminate the need for a central inverter, and in some cases, reliable means of communication among the DC-DC converters is necessary to arrive at and agree upon the desired string current.

The inventors have devised a design that avoids many of the drawbacks they recognized in the above approaches. As seen in FIG. 1, a PV array 105 is divided into substrings 100 typically comprising four to ten modules 110, connected electrically in series. Three substrings are illustrated, but as few as two, or many more than three may be included in further embodiments. Each substring 100 is connected to a DC-DC converter module 120 implementing MPPT, which produces a regulated DC output. The DC output of these substring converters are then connected in parallel to a DC bus 130, which is connected to the input of a simplified, single-stage DC-to-AC inverter 140. The inverter 140 may be coupled to a utility grid 150. In further embodiments, the number of modules in a string may be varied further, such as from 2-20 or more.

This approach has several advantages. The array 105 as a whole is rendered significantly more resistant to energy loss from shadowing, module mismatch, and uneven soiling, but at a significantly lower cost as compared to the microinverter and other approaches that implement electronics on each module. The size of the substring may be selected to provide a voltage output suitable for efficient conversion to the regulated bus voltage, enabling substring DC-DC converters 120 with very low loss. Since the input to and output from the DC-DC converters 120 are both DC, intracyclic energy storage is not required, and so the DC-DC converters 120 do not require large capacitors like the microinverter approach, avoiding the attendant risk of thermal failures when placed proximate to heat sources. The central inverter 140 can be simpler, more efficient, and less expensive than a typical inverter, since it does not require an input stage, due to the distributed regulating function of the substring 100 converters 120. Communication between the central inverter 140 and the substring converters 120 may be accomplished by powerline carrier transmission at a lower total cost than in the microinverter approach, providing a degree of granularity to assist in tracking down the causes of substandard performance. Finally, this approach offers the ability to combine different types of modules in an array without the significant mismatch losses that may be incurred by combining different types of module in a conventional array.

The substring converters 120 may utilize an appropriate circuit topology, for instance a boost converter, to perform MPPT and to step up the voltage relative to the string output. The voltage of the DC energy bus may be selected for efficient conversion to AC at the desired level. For instance, a DC bus voltage of 380V may be suitable to produce conventional 60 Hz 240 VAC RMS output from a single stage inverter. The inverter may utilize a suitable topology, for instance an H-bridge output stage driven by PWM inputs according to closed loop current control to a synthesized sinusoidal command.

Figure 2:
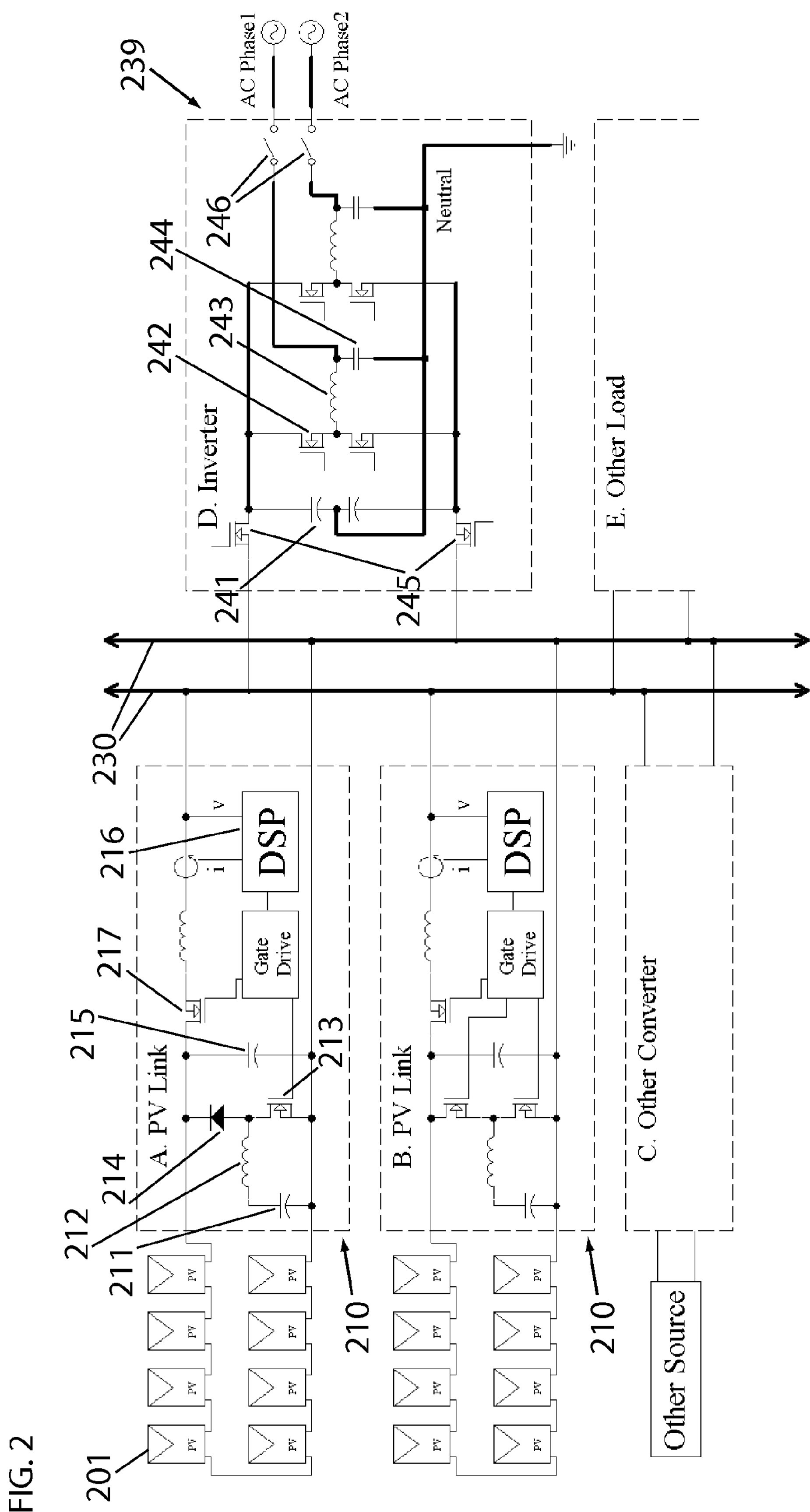
FIG. 2 is a block schematic diagram of a photovoltaic array having distributed DC to DC converters according to an example embodiment.

In one embodiment, illustrated in block schematic form in FIG. 2, series substrings are formed from PV modules 201, each module consisting of series-connected 156 mm crystalline silicon cells. Such modules will have nominal power ratings of 200-250 W, open circuit voltage (Voc) of approximately 37 volts, maximum powerpoint voltage (Vmp) of approximately 30 volts, and maximum powerpoint current (Imp) of approximately 8 amps. A series string of eight such modules will then have an operating voltage of approximately 240 VDC at standard conditions. Modules having different electrical specifications may be used in further embodiments, and may result in the selection of different numbers of modules per string being used to obtain desired operating voltages. While this embodiment is intended to deliver energy into the grid at an operating voltage of 240 VAC RMS, other operating voltages maybe used in further embodiments.

The output of the series substring is connected to a DC-DC converter module 210, which for convenience may be located at or near the substring. The converter module comprises a boost converter, comprising an input capacitance 211, an inductor 212, a silicon switch 213 (for example a Field Effect Transistor (FET) or Insulated Gate Bipolar Transistor (IGBT)), a diode 214, an output capacitance 215, and sensing and control circuitry. The control circuitry may be implemented on a digital signal processing (DSP) chip 216, and is configured to seek and maintain the substring at its observed maximum power point, for instance by modulating the duty cycle of a pulse-width modulated (PWM) signal to the silicon switch 213 in response to current and voltage measurements at the output. This maximum powerpoint tracking may be achieved by known methods including Hill-Climbing or Incremental Conductance. The PWM signal may be operated at a frequency, for instance in the range of 20 to 100 kilohertz, and for instance within the range of 40 to 60 kilohertz, which may be determined based on a trade-off between switching loss (which increases with frequency) and loss in the output inductors (which decreases with frequency).

The output of converter module 210 is connected to a DC bus 230, which may collect the output from several converter modules in parallel. The bus voltage is selected to enable efficient inverter operation. For instance, a bus voltage of +/−190 VDC is appropriate for 240 VAC grid service as is common in US homes. The voltage of the string relative to the bus voltage may be selected to enable very high efficiency conversion, while maintaining safety and providing design flexibility. In the above example, with a nominal differential voltage of 380V on bus 230 and a nominal string operating voltage of 240V, boost converter efficiency of near 99% may be achieved. By comparison, such efficiencies are very difficult to achieve when converting the output of a single module to near 400V, as is typically done for subsequent inversion to 240 VAC. However, the same converter module 210 will function and may be used without modification on substrings of as few as three modules. This provides the system designer with significant flexibility in laying out the array—although the conversion efficiency on these shorter substrings may be lower.

While higher input voltage will allow higher conversion efficiency, when using the boost converter topology, it may be desirable to limit the substring length such that the open circuit voltage of the substring never reaches the operating voltage of the bus, to prevent passive conduction through the diode. PV modules of the type described will typically have a negative dependence of Voc on temperature of about −0.15V/C, such that at minimum rated operating temperature (−40 C) Voc may be as much as 10V higher than nominal. The above-described 8-module substring could conceivably output approximately 376 V at open circuit in very cold conditions.

Other features and functions may be incorporated into the substring converter module 210. For instance, a disconnect switch 217 (for instance a silicon device or a mechanical relay) may be used to enable the substring to be disconnected from the bus, for instance to protect the converter module 210 or other devices on the bus in case of a fault. The converter module 210 may be programmed to disconnect on detection of loss of grid power, for instance to protect fire service personnel from shocks when entering a burning building incorporating a PV array. Conventional solar designs raise safety concerns, since the conductors leading from a PV array to the central inverter cannot be de-energized without physically covering up the array with something opaque to block sunlight.

The conductors of the DC output bus 230 are routed to a place of convenience, typically near an AC distribution panel and at a location convenient for operator interface and inspection, and connected to a simplified DC-to-AC inverter 239 for output to the local grid electric service. The inverter 239 transforms the 380 VDC input power to AC, for instance to 240 VAC 60 Hz split phase output power, which is the US standard for residential distribution. In some embodiments, the DC to DC converter 210 provides approximately 380 VDC, but may vary between 375 to 410 VDC. Similarly, the output of the inverter 239 may by approximately 240 VAC, but may vary between 210 to 250 VAC or some other range that does not adversely affect the ability to safely connect to the local grid.

As the bus voltage has been boosted to a suitable level and constrained to appropriate bounds by the control action of the converter module(s) 210 connected to the bus, the inverter 239 does not require a separate input stage, and can thus be more efficient than conventional inverters. In one embodiment, the inverter 239 comprises an input capacitance 241, two half-bridges formed of silicon switches 242 (e.g. FETs or IGBTs) and driven by PWM signals, and output filters consisting of inductors 243 and capacitors 244 suitably sized to smooth the output waveform of the half-bridges, and current sensors. The half-bridges may be operated at a frequency, for instance in the range of 20-60 kHz, which is determined based on a trade-off between switching loss (which increases with frequency) and loss in the output inductors (which decreases with frequency). The PWM signal that drives the half-bridges is determined by a controller that may be implemented on a digital signal processing chip. At each cycle of the 60 Hz grid frequency, the controller synthesizes a sinusoidal current waveform according to the desired power output, and then commands the PWM output such that the output current matches the desired waveform by closed-loop digital control on the output current sensor measurement.

While the approach of this embodiment has advantages in the context of a small installation with a single converter module, including lower line losses from transmission to the central inverter at 380 V rather than 240V, the approach has additional advantages in the context of larger PV arrays. A plurality of converter modules 210 may be connected to the DC power bus in parallel, and their outputs thus combined, while maintaining the independent maximum powerpoint tracking and performance monitoring functions of each converter 210. Performance monitoring at the substring level enables the system operator to localize and correct any area of underperformance. Independent maximum powerpoint tracking makes the array less susceptible to performance loss from partial shading or soiling of modules, and enables different substrings of the array to be mounted at different angles. In some embodiments, different substrings may be composed of modules of different ratings from different manufacturers, rather than carefully matched as in current practice. Because PV manufacturing technology is advancing rapidly, it is often impossible to buy additional modules to match an existing array after only a few months. Therefore the approach of this embodiment makes PV installations more upgradable and scalable.

While the voltage differential between the rails of the DC bus 230 is approximately 380V, the two rails of the bus 230 may be held symmetric about the neutral line of the split-phase AC service (which is in turn connected to ground) by suitable high-impedance resistors internal to the inverter 239. The maximum potential of either bus conductor to earth is thus less than 200V, approximately the same as that of conventional AC wiring. The split bus approach also provides a sensitive means of detecting a short on either rail, since any stray current will cause a detectable voltage mismatch between the rails.

The inverter 239 may incorporate additional features. For instance, it may be equipped with solid-state or electromechanical switches 245 to disconnect it from the DC bus, for instance to avoid damage in case of a fault. It may further incorporate solid-state or electromechanical switches 246 to disconnect it from the AC grid, in case of fault. It may also incorporate algorithms to detect the presence or absence of grid power, and to shut down in the event of grid failure. Such ‘anti-islanding’ behavior is required by code for interconnection to the utility grid.

Figure 3A:
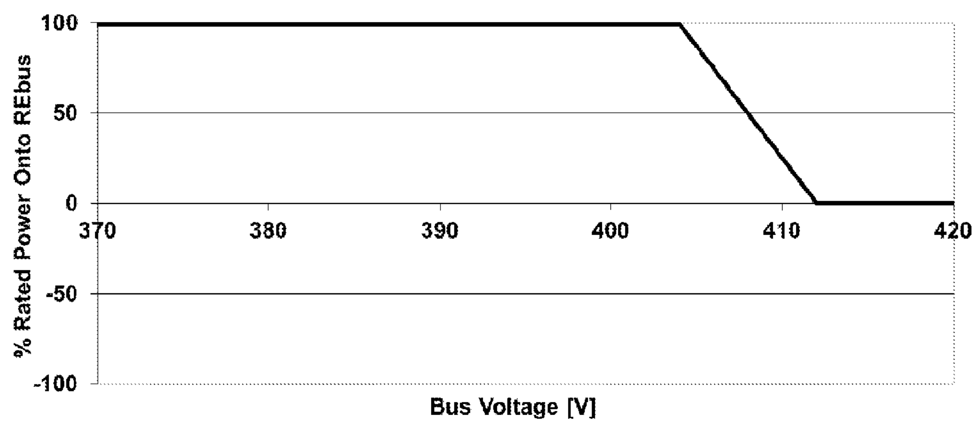
FIG. 3A is a graph illustrating power versus voltage for a programmed DC to DC converter according to an example embodiment.
Figure 3B:
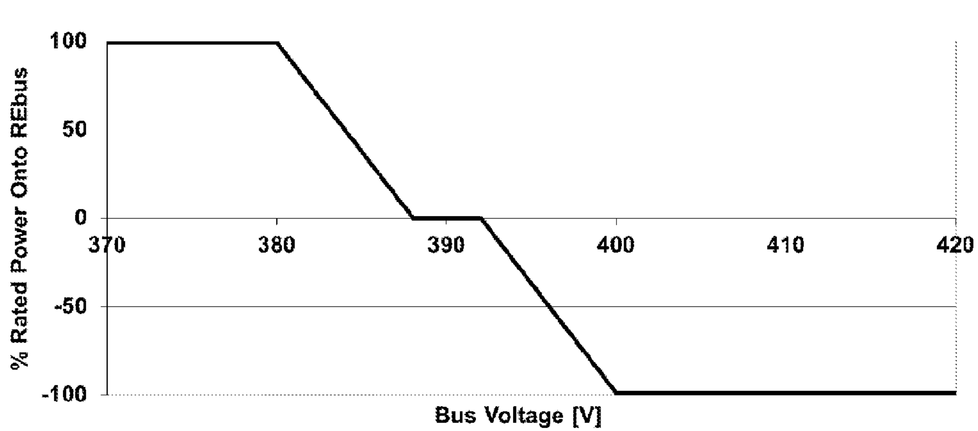
FIG. 3B is a graph illustrating power versus voltage for an alternative programmed DC to AC inverter according to an example embodiment.

As illustrated in FIG. 3A and FIG. 3B, in some embodiments the DC-DC converter 210 is programmed to observe the bus 230 voltage, and to limit the output power as necessary to maintain selected limits on voltage. Specifically, the converter module may be programmed to derate its output linearly once the bus voltage passes a pre-determined threshold. For example, the converter module 210 may output full rated power up to a differential bus voltage of 404 V, and then linearly decrease output power to zero at 412 V. Similarly, the inverter 239 may be programmed to observe the bus voltage, and to modulate its output to absorb the power available on the bus. Specifically, the inverter 239 may be programmed to increase the amount of power it absorbs from the bus and converts to AC proportionally as the bus voltage increases beyond a threshold.

Considering the example given above, a bidirectional inverter 239 may be programmed to supply DC power to the bus when the bus voltage is below 388V as shown in FIG. 3B. In the case of a unidirectional inverter 239, zero DC power would be supplied or absorbed below 392V. But in both cases, when the bus voltage rises above 392V the inverter 239 increases its output linearly with bus voltage up to maximum rated power at 400V. If the aggregate output of PV substring converters 210 sums to half of the rated power of the inverter 239, the bus voltage will stabilize at an equilibrium level of 396V. If on the other hand the aggregate output of the PV substring converters 210 increases to twice the rated power of the inverter 239, the bus voltage will rise to 400V, triggering full inverter output, and continue to rise, due to the surplus of available power. The increasing voltage will signal the substring converters 210 to modulate their output, and the bus voltage will stabilize at 408V—corresponding to each substring converter 210 operating at half its potential output. If such a power surplus occurs regularly, the corresponding system would likely be considered a poor design—since much available solar energy would be wasted due to insufficient inverter capacity. If however a second inverter were connected to the bus in parallel to the first, it would absorb the excess power, the bus voltage would fall to 400V, and the system would then be operating in equilibrium at full power.

Figure 4:
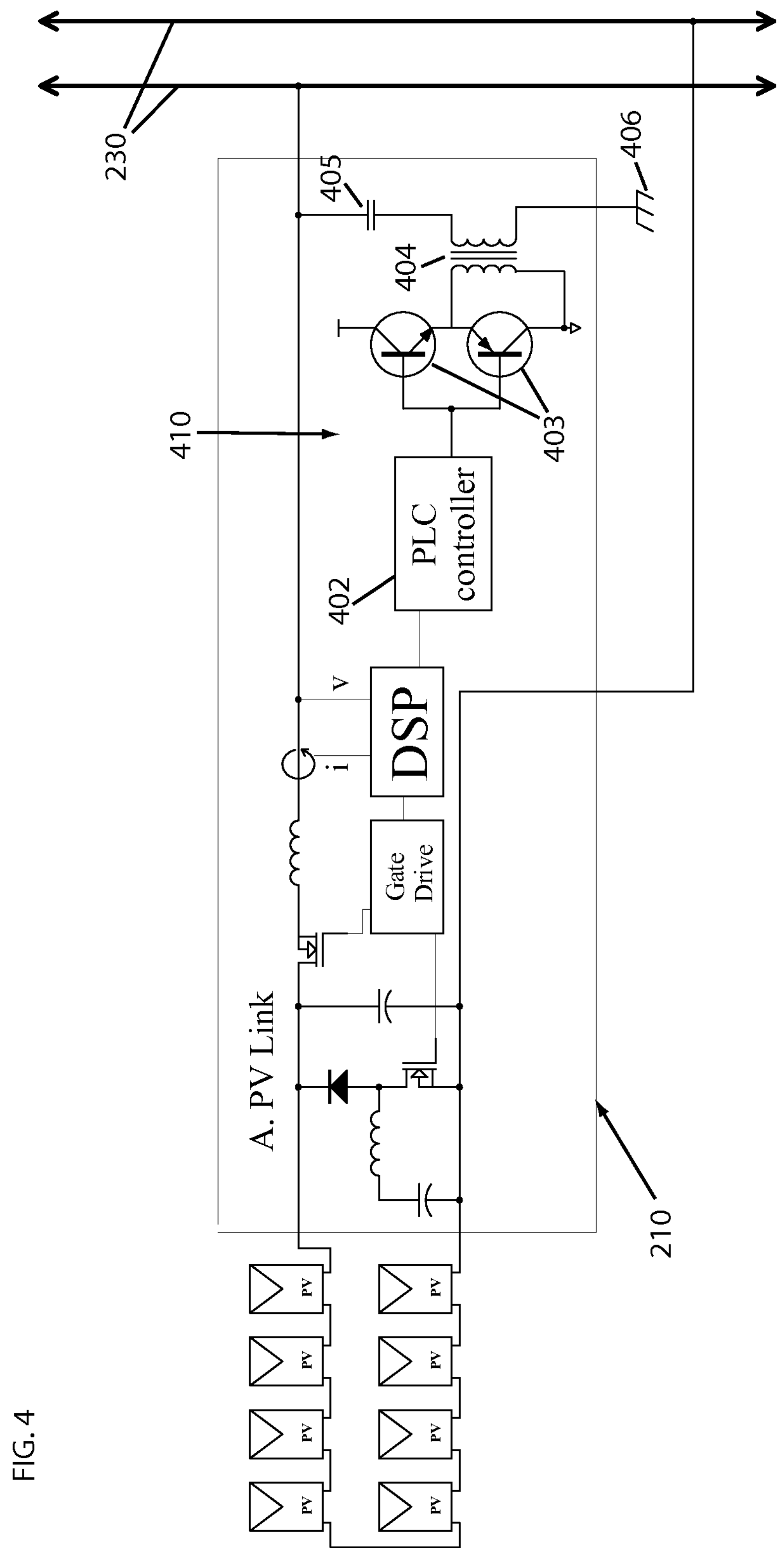
FIG. 4 is a schematic diagram of a coupling circuit according to an example embodiment.

In some embodiments, performance monitoring may be advantageous, and may be achieved at low cost by use of an AC coupling circuit that superimposes low amplitude, high frequency waveforms on the DC current carried by the power conductors of the bus. With reference to FIG. 4, this coupling circuit 401 may consist of a PLC Controller 402 that generates the data-encoded waveform and drives a power amplification circuit 403. The power amplifier is coupled to the DC bus by isolation transformer 404 and voltage blocking capacitor 405. These waveforms may be modulated, for instance by Frequency-Shift Keying (FSK), to transmit digital data on the DC power conductors. A similar coupling circuit 401 may be attached to the bus at any point to access this data. Suitable integrated circuits for interfacing with this data transmission mechanism are commercially available, for instance from Ariane Controls and Echelon Corporation. The modulated waveform may be comprised of a voltage signal relative to earth ground potential 406.

As the foregoing example illustrates, bus stability may be maintained and power managed appropriately among multiple power conversion devices of various types, despite the absence of any master device or centrally-organized system controller, and without the involvement of the powerline carrier communication facility—which is thus strictly optional, and may be used for monitoring and operator management tasks, or dispensed with entirely in cases where cost is the overriding factor.

While in some embodiments the substring DC-DC converters may be physically separate units, in other embodiments it may be preferable to combine multiple DC-DC converters in a single physical assembly or combiner. This may result in lower total cost.

While thus far two system components have been described (a PV substring converter and a grid-tie inverter), other compatible system components may be devised and connected to the bus, provided that they observe the prescribed voltage level conventions. For instance, wind turbines, fuel-cells, and hydroelectric generators may be connected in further embodiments. A robust, flexible, and fault-tolerant power management network or 'microgrid' may thus be assembled from the components described. And while it may often be advantageous to standardize the voltage levels determining the behavior of the various components, it may also be advantageous in some cases to tailor the voltage levels to encode the relative priority of different devices with in each device class.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A photovoltaic array system comprising:

a first string of series-coupled photovoltaic modules, said first string being coupled to a first DC-to-DC converter, wherein the first DC-to-DC converter converts a DC output of the first string for output to a DC bus having DC rails;

a second string of series-coupled photovoltaic modules, said second string being coupled to a second DC-to-DC converter, wherein the second DC-to-DC converter converts a DC output of the second string for output to the DC bus in parallel to the output of the first converter; and an inverter coupled to the DC bus, said inverter converting the DC outputs of the first and second DC-to-DC converters to an AC output, wherein the DC-to-DC converters are adapted to maintain bus stability by a concerted autonomous current response of the DC-to-DC converters and inverter by controlling a duty cycle of a pulse width modulated signal to a DC-to-DC converter switch responsive to sensed voltage of the DC rails, wherein the voltage of the DC rails is sensed by the DC-to-DC converter, and each DC-to-DC converter autonomously derates its output linearly once the sensed voltage passes a pre-determined threshold, with the aggregate effect of controlling the DC bus voltage in cooperation with other units coupled to the DC rails.

2. The photovoltaic array system of claim 1 wherein the DC-to-DC converters provide maximum powerpoint tracking.

3. The photovoltaic array of claim 2 wherein the maximum powerpoint tracking for each string is independent of other strings.

4. The photovoltaic array of claim 3 wherein each dc to dc converter provides a set collection voltage of approximately 380 V to the DC bus.

5. The photovoltaic array system of claim 1 wherein at least one string comprises between 4 and 10 modules.

6. The photovoltaic array system of claim 1 wherein the number of modules in a string is optimized to provide a voltage output suitable for efficient conversion to a regulated voltage.

7. The photovoltaic array system of claim 1 wherein at least one string includes a number of modules such that a voltage of the string provided to its corresponding dc to de converter is approximately 240V.

8. The photovoltaic array system of claim 1 wherein the action of each DC-to-DC converter is independent of the other DC-to-DC converters.

9. The photovoltaic array system of claim 1 wherein the DC bus comprises two conductors, the two conductors operating at substantially equal and opposite voltage with respect to neutral.

10. The array of claim 1, wherein the DC bus includes power line carrier communication between the inverter and the DC-to-DC converters.

11. The system of claim 10 wherein the power line carrier communication includes Frequency Shift Keying encoding for communications.

12. The system of claim 10 wherein the communications are referenced to earth around.

13. The photovoltaic array of claim 12 wherein the DC-to-DC converters regulate the DC bus voltage such that inverter does not need an input stage.

14. The photovoltaic array of claim 1 and further comprising a switch in each DC-to-DC converter to controllably disconnect from the corresponding photovoltaic modules.

15. The photovoltaic array of claim 1 wherein each DC-to-DC converter is adapted to provide a regulated DC voltage to the DC bus.

16. The photovoltaic array of claim 15 wherein a DC-to-DC converter modulates its output to limit the voltage of the DC bus.

17. A method comprising:

receiving DC current on DC rails from multiple sets of series coupled photovoltaic modules, the current being at a voltage dependent on the number of modules in each set;

independently converting the current from each set to a selected DC set collection voltage;

providing the current from each set at the set collection voltage to a set collection line; and providing the currents from each set via the set collection line to an inverter to convert the currents to an AC current, wherein the current from each set at the set collection voltage is autonomously modified by each set and the AC current from the inverter is autonomously modified to maintain bus stability, with the aggregate effect of controlling the DC bus voltage by controlling a duty cycle of a pulse width modulated signal to a DC-to-DC converter switch responsive to DC-to-DC converter sensed voltage of the DC rails, wherein each DC-to-DC converter autonomously derates its output linearly once the sensed voltage passes a pre-determined threshold in cooperation with other units coupled to the DC rails.

18. The method of claim 17 and further comprising:

receiving DC current from at least one other source of energy;

independently converting the current from the other source of energy to the selected DC set collection voltage; and providing the converted current from the other source of energy to the set collection line.

19. The method of claim 17 and further comprising providing maximum powerpoint tracking while converting the current.

20. A photovoltaic array system comprising:

a first string of series-coupled photovoltaic modules, said first string being coupled to a first DC-to-DC converter, wherein the first DC-to-DC converter converts a DC output of the first string for output to a DC bus having DC rails;

a second string of series-coupled photovoltaic modules, said second string being coupled to a second DC-to-DC converter, wherein the second DC-to-DC converter converts a DC output of the second string for output to the DC bus in parallel to the output of the first converter; and an inverter coupled to the DC bus, said inverter converting the DC outputs of the first and second DC-to-DC converters to an AC output, wherein the DC-to-DC converters are adapted to maintain bus stability by a concerted autonomous current response of the DC-to-DC converters and inverter, with the aggregate effect of controlling the DC bus voltage by controlling a duty cycle of a pulse width modulated signal to a DC-to-DC converter switch responsive to sensed voltage of the DC rails, wherein the voltage of the DC rails is sensed by the DC-to-DC converter, and each DC-to-DC converter autonomously Berates its output linearly once the sensed voltage passes a pre-determined threshold, in cooperation with other units coupled to the DC rails wherein each DC-to-DC converter observe the DC bus voltage and limits its output power to maintain selected limits on the DC bus voltage.

* * * * *

UNITED STATES PATENT AND TRADEMARK OFFICE

CERTIFICATE OF CORRECTION

PATENT NO. : 10,411,477 B2
APPLICATION NO. : 13/849320
DATED : September 10, 2019
INVENTOR(S) : Kaufman et al.

It is certified that error appears in the above-identified patent and that said Letters Patent is hereby corrected as shown below:

In the Claims

Column 8, Line 45, Claim 3, after "array", insert --system--

Column 8, Line 48, Claim 4, after "array", insert --system--

Column 8, Line 48, Claim 4, delete "dc to dc" and insert --DC-to-DC-- therefor

Column 8, Line 59, Claim 7, delete "dc to de" and insert --DC-to-DC-- therefor

Column 9, Line 1, Claim 10, delete "array" and insert --photovoltaic array system-- therefor Column 9, Line 4, Claim 11, before "system", insert --photovoltaic array--

Column 9, Line 7, Claim 12, before "system", insert --photovoltaic array--

Column 9, Line 8, Claim 12, delete "around." and insert --ground.-- therefor

Column 9, Line 9, Claim 13, after "array", insert --system--

Column 9, Line 12, Claim 14, after "array", insert --system--

Column 9, Line 15, Claim 15, after "array", insert --system--

Column 9, Line 18, Claim 16, after "array", insert --system--

Column 10, Line 36, Claim 20, delete "Berates" and insert --derates-- therefor

Signed and Sealed this
Fifth Day of May, 2020

Andrei Iancu
*Director of the United States Patent and Trademark Office*